Feb. 20, 1940. J. F. COURTNEY 2,190,934
AUTOMATIC SAFETY SWITCH FOR VEHICLES
Filed Feb. 21, 1938 2 Sheets—Sheet 1
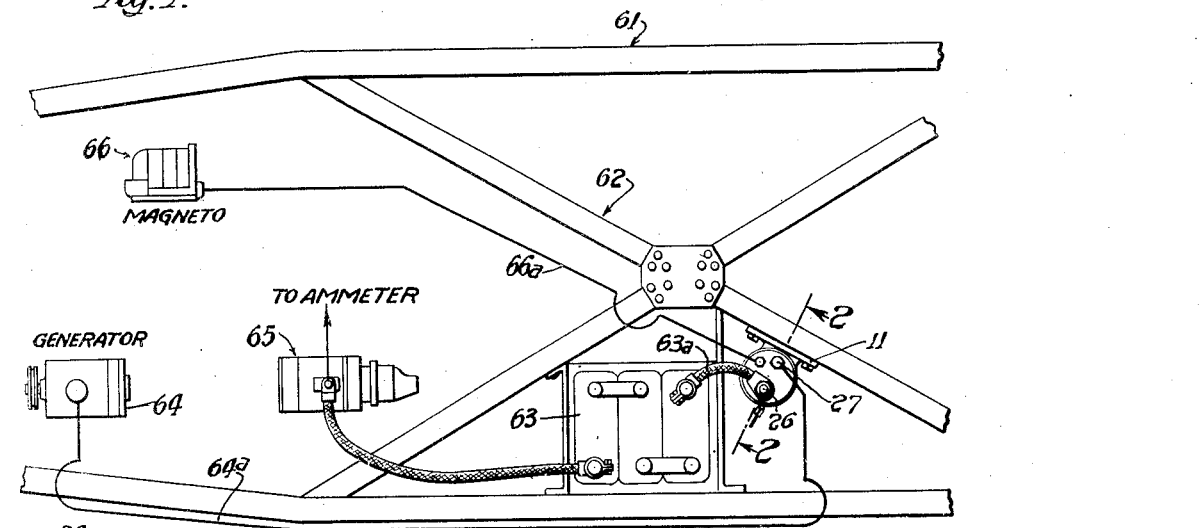
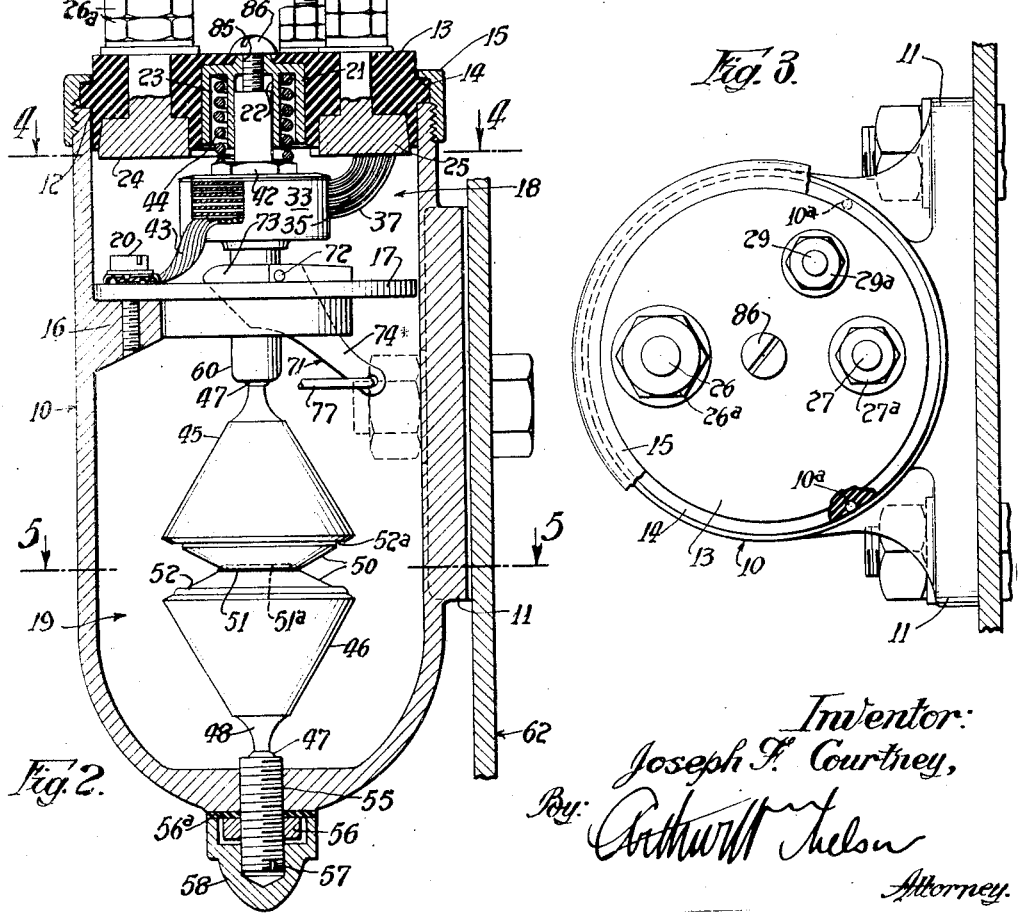
Inventor:
Joseph F. Courtney,
By: Arthur H. Nelson
Attorney.

Feb. 20, 1940.                J. F. COURTNEY                2,190,934
                        AUTOMATIC SAFETY SWITCH FOR VEHICLES
                        Filed Feb. 21, 1938           2 Sheets-Sheet 2
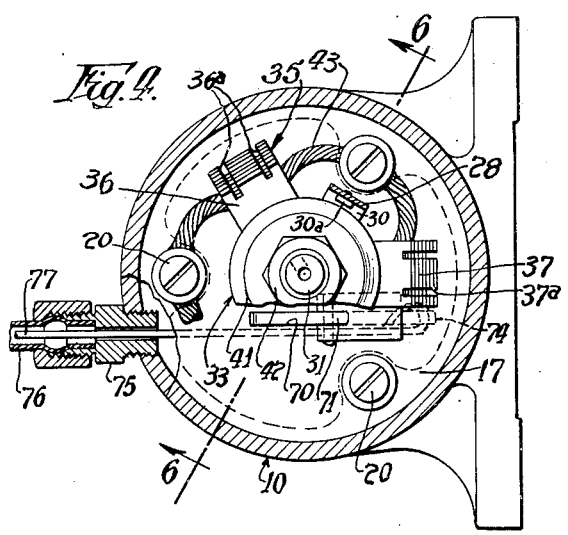
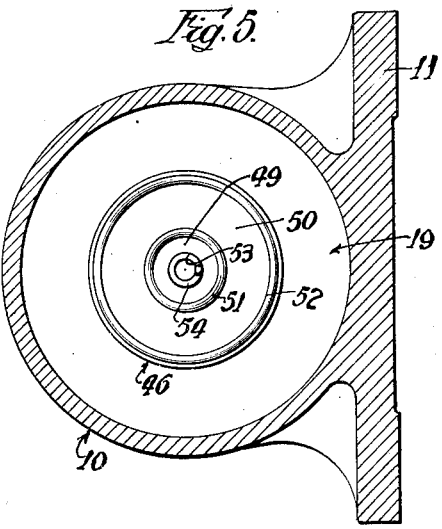
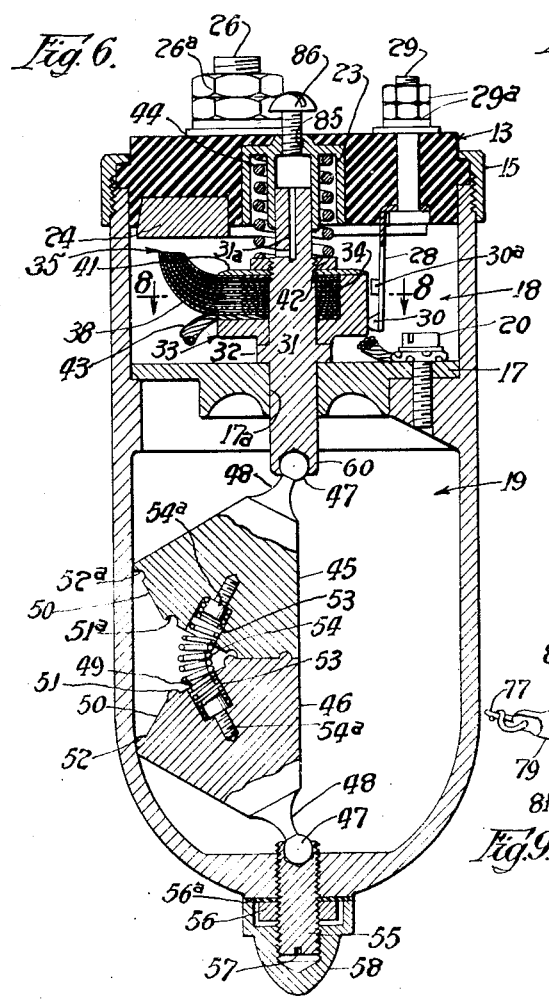
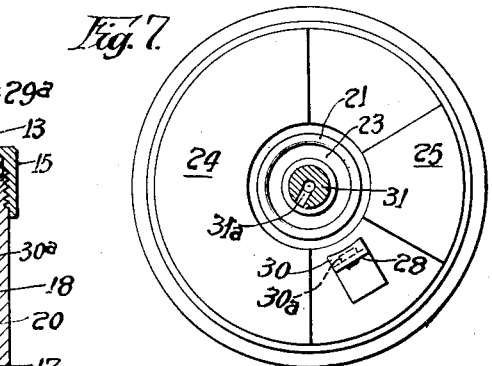
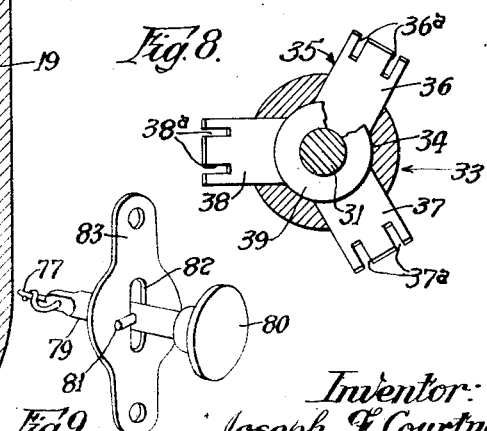
Inventor:
Joseph F. Courtney,
By: Arthur W. Nelson
    Attorney.

Patented Feb. 20, 1940

2,190,934

UNITED STATES PATENT OFFICE 2,190,934

AUTOMATIC SAFETY SWITCH FOR VEHICLES

Joseph F. Courtney, Chicago, Ill.

Application February 21, 1938, Serial No. 191,691

10 Claims. (Cl. 200—52)

This invention relates to improvements in automatic safety switches for vehicles and it consists of the matters hereinafter described and more particularly pointed out in the appended claims.

The switch of the present invention is especially adapted for use in vehicles employing an internal combustion engine as a source of power and the term "vehicle" as used herein is intended to include passenger automobiles, airplanes, motor trucks, busses and the like. Such vehicles withstand the normal shocks and minor accidents of every day use without injury to the passengers or damage to the load carried. Any vehicle of this kind, however, may be subjected to an abnormal shock, such as may be the result of a collision with another vehicle or from running into and bumping some immovable object as may be found along any roadside. Some collisions may be substantially harmless so as to result in only a minor damage to the vehicle. Other collisions, however, may be of a more serious character so as to result in a fire with a consequent loss of life and the loss of vehicle and load. Such a bump or collision is often referred to as a "crash" and as is apparent, the shock imparted to the vehicle is an abnormal one as distinguished from a normal one, as for instance a slight side-swipe or a bumping into a loading platform or into another vehicle not in operation.

In a so-called "crash" as applied to a ground vehicle, the abnormal shock is usually imparted to the vehicle in a horizontal plane to either end or side thereof or to one of the corners thereof. In crashes of this kind, especially where motor trucks are involved, ofttimes the battery lead or ground strap is injured and moves into a position to cause a short circuit and a resulting spark. In some instances a fuel line may be broken or the carburetor knocked off. When the two conditions above mentioned occur at substantially the same time, the spark ignites the fuel and a fire results which destroys not only the vehicle and its load, but also often results in a loss of life.

It is known that in some vehicles, the battery system sometimes momentarily carries extremely high amperage. This high amperage surge is substantially instantaneous and if the same is caused as by a short in a damaged ground strap or lead, resulting from a crash, a considerable open spark results. Such a spark is easily capable of starting a fire by igniting fuel leaking from a damaged fuel line, broken carburetor or fuel tank. Another cause which produces enough spark to start a fire may be a current discharge from the generator under the action of engine momentum. In vehicles employing magnetos for ignition current supply, another danger is present because such a supply may still cause the motor to function even after a crash so that the exhaust thereof may start a fire.

So called automatic safety switches for vehicles as at present made, may function in the case of a turnover to cut off the ignition to stop the engine, but they are not operative to prevent a current surge of high amperage as produced through a short in the battery system, which is capable of starting a fire.

Attempts have been made in some switches to provide means for taking care of high amperage of current surge and such switches necessitated extreme pressures to break the circuit from the battery in case of a short in a crash, Such pressures required either powerful solenoids which increased cost or a complicated arrangement of levers and springs which would not always function when most needed.

One of the objects of the present invention is to provide a switch for a vehicle which when said vehicle is subjected to an abnormal shock, such as encountered in a crash, so functions as to render inoperative the entire electrical system of the vehicle, including the starting, lighting, charging and ignition circuits, thus eliminating all possibilities of fires resulting from shorts, exhaust flames, generator commutator and ignition sparks.

A further object of the invention is to provide a device which under the action of an abnormal shock to the vehicle, instantly opens the ground connection of the battery and opens the generator field ground lead, and which when the vehicle includes a magneto, grounds the primary circuit thereof to render the magneto ineffective.

The above mentioned objects of the invention, as well as others, together with the advantages thereof, will more fully appear as the specification proceeds.

In the drawings:

Fig. 1 is a diagrammatic top plan view of the chassis frame of a motor vehicle to which a switch embodying the preferred form of the invention has been applied.

Fig. 2 is a vertical sectional view through the improved switch, on an enlarged scale, when in its "set" operative condition, the plane of the section being indicated by the line 2—2 of Fig. 1.

Fig. 3 is a top plan view of the switch appearing in Fig. 2, certain parts being shown as broken away better to illustrate the structure thereof.

Fig. 4 is a horizontal sectional view through the switch as taken on the line 4—4 of Fig. 2.

Fig. 5 is another horizontal sectional view through the switch as taken on the line 5—5 of Fig. 2.

Fig. 6 is a vertical sectional view through the switch as taken on the line 6—6 of Fig. 4 and illustrates the parts as "tripped" as under the action of an abnormal shock, to render the circuits controlled by the switch ineffective.

Fig. 7 is a view in elevation of the underside of the fixed contact carrying head of the switch.

Fig. 8 is a detail horizontal sectional view through a part of the switch as taken on the line 8—8 of Fig. 6 and illustrates more particularly the structure of the movable contacts of the switch and associated spacer elements.

Fig. 9 is a perspective view illustrating one form of manually operable means for either resetting the switch after a tripping thereof or for holding the switch against tripping.

In general the switch includes one or more fixed contacts and one or more movable contacts and a supporting means for the movable contacts which releasably holds the latter normally in engagement with the former. The supporting means is of a special construction in that it comprises a plurality of parts arranged end to end, the parts being so engaged that when the vehicle is subjected to an abnormal shock said parts automatically become disarranged from supporting relation so that the contacts are disengaged.

The operating parts constituting the switch are enclosed in a casing whereby the parts are protected from dirt and the like and this casing is fixed in grounded relation in the vehicle frame at any suitable point thereon. When the vehicle frame has some one of its parts disposed in or near the center of gravity thereof, the casing is attached thereto so that no matter from which direction the abnormal shock of a collision or crash is imparted to the frame, it is operatively transmitted to the switch so that the switch functions as intended.

Referring now in detail to that embodiment of the invention illustrated in the drawings, the improved switch includes a cylindrical metallic casing 10 which when applied to a vehicle such as an automobile, a truck or a bus, is preferably arranged in a vertical plane. To simplify the attachment of the casing to a part of a vehicle, the casing is provided along one side with lateral ears 11 whereby the casing may be secured to a part of the vehicle frame as will later appear.

The casing is open at one end 12 and which end is usually the top end of the casing, the bottom end of the casing being closed. A head 13 of insulation material fits in the open top end of the casing to close the same. The head is formed with an annular shoulder 14 for engagement on the edge of the open top end of the casing, and a clamping ring 15 is threaded upon said end of the casing and so engages said shoulder as to hold the head in snug fitting engagement thereon. Within the interior of the casing, a suitable distance from the open top end thereof is an annular shoulder 16. A partition or plate 17 is engaged on the top side of said shoulder and said partition or plate divides the casing into a top end switch chamber 18 and a bottom end chamber 19. Screws 20 pass through the marginal part of the plate 17 into the shoulder 16 to removably secure the plate in position.

The head 13 is preferably made of an insulation material which can be moulded. A metallic bushing 21 is secured axially in the underside of the head and this bushing includes a downwardly opening axial recess 22 and an annular recess 23 the purposes of which will later appear.

Also suitably secured in the underside of said head is a pair of separated fixed contacts 24—25, the former one having the larger area. These contacts are preferably made of a good current conducting material such as copper and each includes a stud 26—27 respectively that extends up through the top surface of the head to provide terminals for the attachment of electrical conductors thereto. Each stud has a nut and washer 26a—27a threaded thereon so as to clamp the associated contact in the head. To provide for the proper positioning of the head and its contacts, with respect to the casing during the assembly of the switch, the top end edge of the casing is provided with pilot pins 10a that register with suitable recesses in the shoulder 14 on the marginal part of the head.

Under certain conditions a third contact 28 is secured in the head and said contact includes a stud 29 that also opens through the top surface of the head to provide a terminal for the attachment of another conductor thereto. This stud has a clamping nut and washer 29a engaged thereon. The contact member 28 is in the form of a relatively yieldable depending contact finger that extends into the chamber 18. The bottom end of said finger is formed along its inner face with a cam 30 and projecting from the inner face of said finger, a suitable distance above the cam, is an insulation button 30a.

A stem 31 is disposed axially in the upper end of the casing and the bottom end portion of said stem has a sliding bearing in an axial hole 17a in the plate 17 so as to extend into the chamber 19. The top end of said stem has sliding bearing in the recess 22 of the bushing 21. To prevent the formation of a vacuous condition or an air cushion in the recess 22 above the top end of the stem, said end of the stem has a relief passage 31a formed therein as best shown in Fig. 6.

A shoulder 32 is provided on the stem a suitable distance above the plate 17 for the support of an open top, contact holding head indicated as a whole at 33. This head is provided in its top side with a central recess 34 having a plurality of radial extensions that open through the margin of the head as best appears in Fig. 8. A triplex contact brush 35 is arranged in said recess 34. Said brush is made up from a plurality of laminated elements each including radial upturned fingers 36—37 and 38 respectively engaged in said radial extensions of the recess 34. The central portions of said laminated elements are spaced apart by washers 39 arranged in said recess. A cap disk 41 is disposed upon the open top end of the head and a nut 42 is then threaded on the top end portion of the stem 31 to engage the cap disk so that the cap disk clamps the movable contact assembly securely together.

The outer ends of the spring contact fingers 36—37 and 38 are curved upwardly so that the end edges thereof face in a direction for a good edge-like contact engagement with the associated fixed contacts 24—25. In this instance, the yielding contact fingers 36—37 are associated with the fixed contact 24 and the yielding contact finger 38 is associated with the fixed contact 25. Preferably the upwardly curved outer ends of the fingers 36—37 and 38 are formed with recesses 36a—37a and 38a as shown in Fig. 8 and which recesses divide said outer end into a plurality of more springy portions whereby said portions may float or move relatively so as better to engage the associated fixed contact. Each contact 36—37 and 38 is electrically connected by conductors 43 to the plate 17 and the screws 20 before mentioned are employed for this purpose. Portions of these conductors are clamped in between the laminated contact brush and the head 33 as best appears in Fig. 6.

It is apparent that when the yielding contact fingers 36—37 and 38 are in engagement under tension with the fixed contacts 24 and 25, a circuit is completed between the fixed contacts and the casing and when said yielding contacts are out of engagement with said fixed contacts, said circuit is broken. To assist in moving the contact fingers 36—37 and 38 out of engagement with the fixed contacts, under conditions later to appear, an expansion spring 44 is disposed in the recess 23 of the bushing 21 so as to engage against the nut 42.

To releasably hold the contact fingers 36—37 and 38 in contact engagement with the fixed contacts 24—25, I provide a supporting arrangement in the chamber 19 for the stem 31. This supporting arrangement is of a novel construction in that it comprises a plurality of parts so formed and engaged with each other as to normally hold the contacts in engagement under the action of any normal shock transmitted to the switch as a whole. However, under the action of an abnormal shock transmitted to the switch as a whole, said parts become disarranged whereby the supporting function is destroyed and the yielding contacts are instantly moved out of engagement with the fixed contacts to break the circuit therebetween.

As shown in the drawings, said stem supporting arrangement comprises a pair of substantially conically shaped upper and lower members 45 and 46 respectively, which when in longitudinal alignment act as a strut under compression. Each member 45—46 is provided at its apex end with a spherical head 47 connected to the body of the respective member by a neck 48 of reduced diameter. The base portion of each member and which contains the greater mass and weight, is provided with a flat end 49 of a diameter less than that of the base portion as a whole and this flat end is connected to the parts of widest diameter of the body of the member by a surface 50. As shown herein the main body portion has a substantially 60° taper and the surface 50 has a substantially 30° taper. On the surface 50 of one member annular ribs 51—52 are formed so as to register with annular grooves 51a—52a in the surface 50 of the other member.

Axially in the base end of each member and opening through the flat end surface 49 thereof is a recess 53. The two members 45—46 are yieldingly held together in operative relation, with the flat end surfaces 49 of their base ends engaged with each other by means of a helical spring 54, disposed in the recesses 53 of both members. The end convolutions of the spring carry studs 54a that have a screw threaded engagement in the inner end parts of reduced diameter of the recesses 53. With the two members 45—46 arranged in this manner, they function somewhat in the manner of a universal joint which can break in any direction laterally. When the members 45—46 are arranged in axial alignment, it is apparent that the spherical heads 47—47 of said members are spaced the greatest distance apart. When said base ends of said members are moved laterally relatively, the engagement between the flat end surfaces 49 is broken and an engagement is then afforded between two radial lines along the surfaces 50—50 of said members. Under such conditions, the distance between the centers of the spherical heads 47—47 when the latter are maintained in alignment, is decreased or shortened.

A stem 55 is threaded axially in the bottom of the casing and this stem carries a socket on that end within the casing and which socket receives the head 47 on the apex end of the member 46. A clamp nut 56 is provided on the stem without the bottom end of the casing and said stem is provided with a cross groove 57 to receive a screw driver blade for turning the stem. By loosening the nut 56 and turning the stem 55 in one direction or the other, the socket end of said stem may be moved inwardly away from or outwardly toward the bottom end of the casing. This permits of the proper adjustment of the stem which may be clamped in the adjusted position by the nut. A cap 58 is threaded on the exposed end of the stem to act as a protector for the stem and a finishing member for the casing. A gasket washer 56a is disposed between the bottom end of the casing and the nut 56.

The bottom end of the stem 31 is formed with a socket 60 to receive the spherical head 47 of the member 45. In the assembly of the parts just above described when the parts 45—46 are in their aligned position as shown in Fig. 2, the stem 55 is adjusted upwardly until the contact fingers 36—37 and 38 are tensioned into a relatively tight contact engagement with the fixed contacts 24—25 after which the stem is secured in the adjusted position by means of the nut 56. This places the members 45—46 under compression so that they cooperate in affording a rigid strut-like support which acts through the stem 31 to hold said movable contacts in engagement with the fixed contacts. In normal operation shocks or jars are imparted to the casing in the direction of its axis and are ineffective in causing a separation between the members 45—46. It is pointed out that when the contacts 36—37 and 38 are engaged with the contacts 24—25, they are under considerable tension so that the end portions of said fingers spread apart laterally as appears in Fig. 2. Thus the end edges of said fingers engage the opposed surface of the contacts 24—25 with a biting action to insure a positive current conducting engagement between the fixed and movable contacts.

In Fig. 1 I have shown the switch as applied to the chassis frame 61 of an automotive vehicle such as a truck. Usually such frames include a secondary X frame 62 for rigidity and the intersection of said frame usually approximates the center of gravity of the vehicle. When the switch is to be incorporated in a vehicle having this kind of frame, it is preferred that the switch be attached to the X frame in a vertical position, as near as possible to the center of gravity of the vehicle as afforded by the intersection mentioned. In attaching the switch in place, holes are drilled in the web of one of the members of the X frame to line up with the holes in the casing ears 11 after which bolts are employed in the registering holes as appears in Figs. 1–2 and 3 respectively. This insures a good ground connection between the switch casing and the frame.

A vehicle of this kind usually carries a battery 63 supported in suitable hangers from the frame and said battery is grounded to the frame by a strap 63a. Said vehicle usually includes a generator 64 for supplying current for general consumption and battery charging as well as a motor 65 for starting the engine of the vehicle. In some instances the vehicle may include a magneto 66 for ignition purposes. After the improved switch has been applied, one end of the ground strap 63a is operatively connected to the terminal 26 of the fixed contact 24 of the switch. It is preferred that this strap be enclosed in a sheath of insulation although this is not essential. When the contacts 36—37 and 38 are in engagement with the fixed contacts 24 and 25, the battery is still grounded through the switch to the frame as is apparent. The general field ground lead 64a from the generator 64 is connected to the terminal 27 of the contact 25 and a grounding line 66a connects the magneto with the terminal 29 which is held out of circuit to ground by reason of the engagement of the insulation button 30a on the finger 28 with the head 33 on the stem 31. With the parts connected as described, it is apparent that the battery and the generator are connected to a ground while the magneto is disconnected therefrom.

It is apparent that in travel of the vehicle over a highway, such vertical joltings and jarrings as are imparted to the vehicle by the unevenness of the highway are imparted to the vehicle in a direction parallel with the axis of the members 45—46. Thus ordinary shocks or jars, met with in such movement are ineffective to displace the supporting members 45—46.

Assume, however, that the vehicle is involved in a collision with another vehicle or is crashed into from either side or the rear end or any corner of the frame or that the vehicle crashes into a light pole, signal standard, tree or other immovable object along a highway. It is apparent that such shocks as are imparted to the vehicle under the conditions above noted, are imparted in a substantially horizontal plane and at an angle to the axis of the switch casing.

When the shock is of such an intensity as to be rated as an abnormal one so as to ordinarily result in serious damage to the vehicle, the force of the shock overcomes the inertia of the members 45—46 as held together by the combined resistance of the contact fingers 36—37 and 38 and spring 44 so that the ends of the members 45—46 of greater weight and mass swing laterally to remove the axes of said members out of the axis of the stem 31. This releases said members from their normal supporting relation so that the combined energy of the contact fingers 36—37 and 38 and the spring 44 exerts a force which immediately breaks the joint-like effect between said members and throws said members into the position shown in Fig. 6. In such a position the parts of said members of greatest diameter substantially engage the inner surface of the casing.

As the two members move relatively under the action of the abnormal shock, as before mentioned, the spring fingers 36—37 and 38 leave the contacts 24 and 25 and assisted by the spring 44 provides a quick breaking between the movable and the fixed contacts so as to break the grounded connection therebetween.

In this action, the stem 31 moves downwardly a distance equal to the relative movement between the spherical heads 47 of the two members 45—46. In this movement of the stem, the head 33 moves therewith so that the bottom corner edge of said head engages the cam 30 at the bottom end of the finger 28 and provides a connection with the ground for the magneto which is thereby instantly rendered inoperative. Thus, even though the engine of the vehicle runs under momentum after the crash, the generator and magneto are rendered inoperative to produce a current discharge, so that no sparks are produced from those sources. Assume that the main lead from the battery has become broken or abraded and engages against some part of the vehicle frame. Under ordinary circumstances with the other side of the battery still grounded, a short is instantly produced, the first surge of which may total several hundred amperes to produce a spark of great intensity. However, as the switch has operated to break the ground connection from the battery at the instant of the crash, no short can occur from a broken or skinned battery lead.

Thus at substantially the instant of the crash, the battery, generator and magneto when present, are all rendered inoperative so that even though a fuel feed line has been broken in the crash, there are no sparks to ignite the leaking fuel to start a fire.

Under some conditions of use, it may be deemed desirable to reset the switch after it has been tripped by the shock of a crash. Also, it might be desired in some instances to place the operation of the switch under the control of the operator, due to some law regulating vehicle movement. To meet these conditions, I provide the following:

In the plate 17 I provide an elongated opening 70 positioned within the circle of the head 33 and which opening is arranged tangentially with respect to that part of the stem 31 extending through said plate. A bell crank lever 71 is pivoted at 72 in the plate so that one arm 73 thereof is normally disposed to fill said opening and the other arm 74 thereof depends into the chamber 19. This best appears in Fig. 2. A bushing 75 (see Fig. 4) is fixed tangentially at one point in the casing substantially in line with the free end of the arm 74. A tubular sheath 76 is anchored at one end in said bushing and the other end is bent to extend upwardly from the casing. A flexible bell crank actuating member in the form of a wire 77 is arranged in the tube and one end of said wire is fixed to the end of the arm 74. The other end of said wire is connected to an operating member located conveniently for the operator. As shown in Fig. 9 this operating member is in the form of a stem 79 having a knob 80 thereon as well as a cross pin 81. This stem extends through a keyhole-like opening 82 in a plate 83 secured to any suitable support.

When the knob 80 is in the "in" position, the lever 71 stands in the position in the slot 70 shown in full lines in Fig. 2. At this time, it is out of all operative engagement with the head 33 on the stem 31.

However, should the switch have been tripped under the action of the abnormal shock before mentioned and it is then desired to reset the switch, it is only necessary to impart a pull on the knob 80. Through the wire 77 this pull swings the lever 71 counterclockwise, at which time the lever arm 73 engages the underside of the head 33 and imparts a lifting movement to the stem 31. At this time, the yielding contacts are engaged with the fixed contacts and are placed under tension and the spring 44 is placed under compression. In this movement of the stem back to its "set" position, the spring 54 in the recesses 53—53 of the two members 45 and 46 tends to straighten out and to swing the said two members into alignment with each other so that the axes thereof coincide with the axis of the stems 31 and 55. The switch is now reset into its normal operating condition.

It it is desired to lock the switch in this condition, the knob 80 is turned to bring the pin 81 crosswise of the slot 82 in the plate 83 so that the wire 77 is held under tension in a manner holding the lever 71 in a position wherein its arm 73 will prevent any downward movement of the head 33 and stem 31.

It is to be noted that when the parts 45—46 are in their contact supporting position the flat end faces 49 thereof are held against disengagement due to a lateral force or shock of a predetermined magnitude by the combined action of the tension force of the contact fingers 36—37 and 38 and by the compression force of the spring 44, the tension force of said fingers being the predominating force. It is further to be noted that any point on the peripheral edge of these flat surfaces is further away from the center of the heads 47 than is the central axial point of said surfaces. This arrangement in connection with the action of the fingers and spring as above mentioned has a definite function in that it forms a positive lock against operation of the two members under the action of a normal shock such as bumping into a loading platform in the ordinary manner. It is apparent that with this construction, so soon as the base ends of the members 45—46 tend to move laterally under the action of a lateral force or shock, they cannot "break" apart out of supporting engagement, unless said shock or force is capable of further tensioning the fingers 36—37 and 38 and further compressing the spring 44 to a condition permitting some point on the peripheral edges of the surfaces 49 to swing through the axial plane of the stem. Thus in the first instance of shock such as a normal one, the tendency of these two flat surfaces in connection with the contact fingers 36—37 and 38 and the spring 44, is to resist breaking between the parts and when the resistance is overcome by the force of the abnormal shock, the parts break apart to permit the switch to function as before described. So soon as some point on the peripheral edges of the surfaces 49 swing through the axial plane of the stem, the force stored up in the fingers 36—37 and 38 and in the spring 44 function to cause the break to be made with a snap action.

It is to be noted that the casing is fluid-tight. Thus, it may be filled completely with a lubricant, to protect the operating parts against moisture and at the same time dampen any sparking tendency in the separation of the contacts in the operation of the switch.

By reason of the spring finger or laminated construction of the yielding contacts of the device, a positive engagement with the fixed contacts is assured that will carry a heavy current load without damage and at the same time will permit a complete easy and free separation between said contacts when necessary.

When the switch is employed in an aeroplane, it is disposed in such a plane that the force of a crash, which is generally in a more or less vertical plane, is effective in producing operation of the switch to cut out all electric circuits which are dangerous in a crash of the aeroplane.

When the switch is shipped to its place of installation, it is shipped in its "set" condition ready for such installation. In such shipment, the switch may be so roughly handled as to receive shocks which might cause its tripping before such installation. To prevent such a tripping under the conditions above noted, the following structure is provided. A threaded hole 85 is provided through the head 13 and the end of the bushing 21 axially with the top end of the stem 31. A screw 86 is threaded in to said hole so as tightly to engage the top end of the stem 31 within the recess 22 in said bushing. By properly tightening up this screw, a compression force is imposed upon the two members 45—46, through the stem 31 which is of such intensity as to prevent separation between the base ends of said members under the action of substantially any kind of abnormal shock. After the switch has been installed, this screw must first be loosened as appears in Fig. 6 to an extent permitting the switch to function as intended.

The switch is of a relative simple construction, is small and compact and is positive in operation under the conditions for which it is intended.

When a vehicle, to which the improved switch has been applied, stops short under a sudden braking effort, such stops will not function as an abnormal shock to trip the switch.

While in describing the invention, I have referred in detail to the form, arrangement and construction of the parts involved, the same is to be considered only in the illustrative sense so that I do not wish to be limited thereto except as may be specifically pointed out in the appended claims.

I claim as my invention:

1. A switch embodying therein means providing a fixed contact, a fixed support spaced therefrom, a second contact mounted for movement toward and away from said fixed contact, means providing a strut arranged between said fixed support and said second contact for holding the latter in engagement with said fixed contact, said strut comprising a plurality of parts held together in strut forming relation under compression, said parts being formed for disengagement from said supporting relation upon subjection to an abnormal shock to produce a disengagement between said contacts.

2. A switch embodying therein, means providing a fixed contact, a fixed support spaced therefrom, a second contact mounted for movement toward and away from said fixed contact, means disposed between said fixed support and said second contact, said means comprising a plurality of parts arranged in end-to-end relation for supporting said second contact in operative engagement with said fixed contact, the opposite ends of said members comprising said supporting means having operative connection with said fixed support and said second contact respectively, the ends of said members between said opposite ends being overweighted with respect to said first mentioned end and being so formed and engaged with each other as to be moved out of supporting relation upon being subjected to an abnormal shock to produce a disengagement between said contacts.

3. A switch embodying therein, means providing a fixed contact, a fixed support spaced therefrom, a second contact mounted for movement toward and away from said fixed contact, means disposed between said fixed support and said second contact, said means comprising a plurality of parts arranged in end-to-end relation for supporting said second contact in operative engagement with said fixed contact, the opposite ends of said members comprising supporting means having operative connection with said fixed support and said second contact respectively, the ends of said members between said opposite ends being so formed and engaged with each other as to be moved out of supporting relation upon subjection to an abnormal shock to produce a disengagement between said contacts, and means associated with the ends of said members between said opposite ends, normally tending to hold said members in said supporting relation but being capable of yielding laterally to permit said members to move out of said supporting relation.

4. A switch embodying therein means providing a fixed contact, a fixed support spaced therefrom, a second contact mounted for movement toward and away from said fixed contact, means disposed between said fixed support and said second contact, said means comprising a plurality of parts arranged in end-to-end relation for supporting said second contact in operative engagement with said fixed contact, the opposite ends of said members comprising said supporting means having operative connection with said fixed support and said second contact respectively, the ends of members between said opposite ends having a mass greater than that of said opposite ends and being so formed and engaged with each other as to be moved out of said supporting relation upon subjection to an abnormal shock to produce a disengagement between said contacts.

5. A switch embodying therein means providing a fixed contact, a fixed support spaced therefrom, a second contact mounted for movement toward and away from said fixed contact, a pair of oppositely facing substantially cone shaped members, normally disposed in supporting relation between said fixed support and said second contact, said cone shaped members having their outer apex-like ends operatively connected to said fixed support and said second contact respectively, the inner base ends of said members being engaged with each other, said base ends being so further formed that said pair of members will move out of said supporting relation upon subjection to an abnormal shock to produce a disengagement between said contacts.

6. A switch embodying therein a casing, means providing a fixed contact in one end of the casing, a thrust receiving portion at the other end of the casing, a second contact in the casing movable into and out of engagement with the fixed contact, means disposed in said casing between second contact and said thrust receiving portion and comprising a plurality of parts arranged end-to-end in supporting relation to said second contact for holding the same in engagement with said fixed contact, said parts having meeting ends, resilient means associated with said meeting ends and normally tending to hold them in said supporting relation and which meeting ends are so formed that said members are moved out of said supporting relation upon subjection to an abnormal shock to produce a disengagement between said contacts, and means operative from without the casing for resetting said parts in said supporting relation after they have been moved out of that relation.

7. A switch embodying therein a casing, means providing a fixed contact in one end of the casing, a second contact in said casing mounted for movement toward and away from the first mentioned one, means providing a strut between said second contact and the other end of the casing for holding said second contact in operative engagement with the fixed contact, said strut comprising parts held together in strut forming relation under compression, said parts being substantially cone-shaped with their base ends in operative engagement and with their apex ends arranged one operatively connected to said other end of the casing and the other operatively connected to the said second contact.

8. A switch embodying therein a fixed contact, a second contact movable into and out of operative engagement with said fixed contact, a fixed support, means having guided movement and carrying said second contact, a substantially conically shaped member having its apex end connected to said fixed support for movement in any radial plane, a second substantially conically shaped member having its apex end connected to said second contact for movement in any radial plane, the base ends of said members being adapted for engagement when said members are disposed coaxially, and means operating through said contact supporting means for holding said members together under a compressive force.

9. In an electrical switch, means comprising a pair of substantially conical members, arranged with their base end portions of greatest diameter facing toward each other and with their apex ends arranged at the opposite ends of the assembly, means providing a head on the apex end of each member, means providing coacting end surfaces beyond said base end portions of said members and which surfaces are of a diameter less than that of said base end portions, and means on the end surfaces of the base end portion of one member for engaging in a part of the end surface of the base end of the other member.

10. In a control mechanism, means providing an enclosing body, a stem slidably mounted in one end of said body and normally occupying a predetermined position therein, spring means normally urging said stem out of said predetermined position into a second position toward the other end of said body, means in said body providing a strut between said stem and said other end of said body for supporting said stem in said predetermined position in opposition to said spring pressed means, said strut comprising a plurality of parts held together in strut forming relation under compression by said spring pressed means and said stem, said parts being formed for disengagement from said supporting relation upon subjection to an abnormal shock to release said stem for movement into said second position toward said other end of said body under the action of said spring pressed means.

JOSEPH F. COURTNEY.